Jan. 22, 1946.　　　J. M. POWERS　　　2,393,565
PRODUCTION OF AVIATION GASOLINE
Filed May 10, 1943
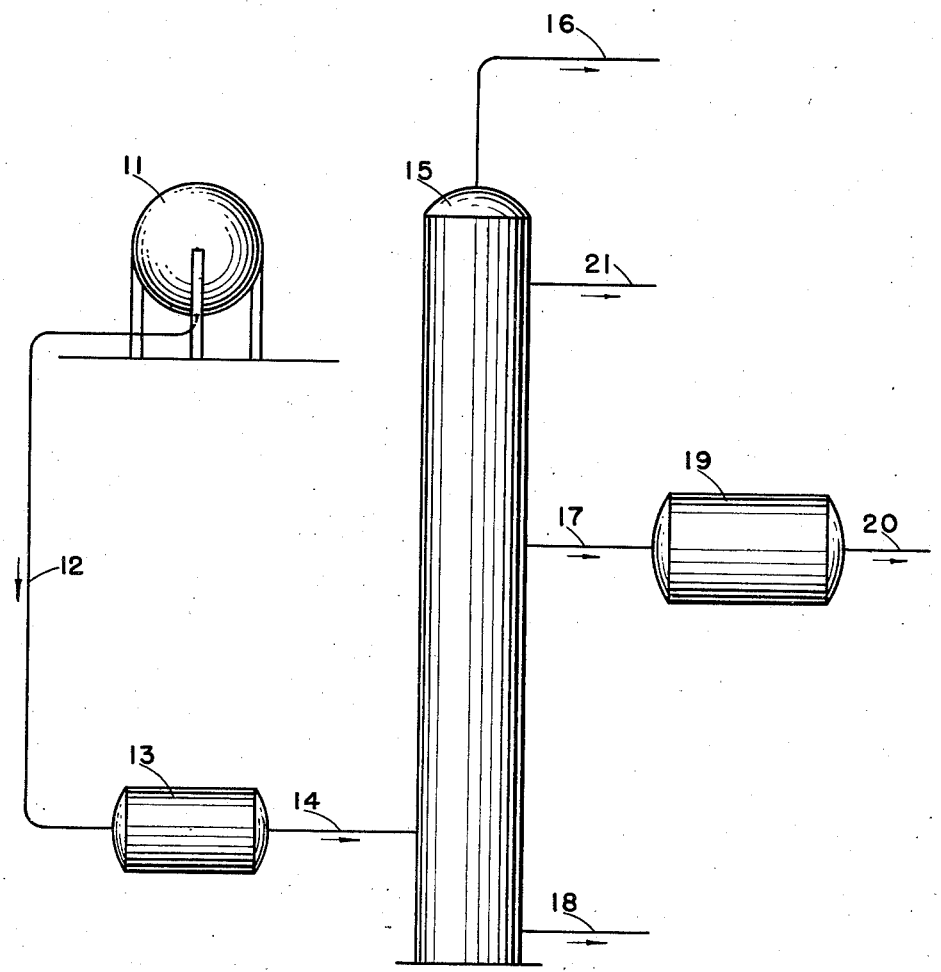
John M. Powers INVENTOR.
BY
J. G. McKean
ATTORNEY.

Patented Jan. 22, 1946

2,393,565

UNITED STATES PATENT OFFICE 2,393,565

PRODUCTION OF AVIATION GASOLINE

John M. Powers, Baytown, Tex., assignor to Standard Oil Development Company, a corporation of Delaware Application May 10, 1943, Serial No. 486,339

8 Claims. (Cl. 260—666)

The present invention is directed to the treatment of low molecular weight paraffinic materials to form highly aromatic stock particularly suitable for use as aviation gasoline therefrom.

The present invention may be described briefly as involving the thermal polymerization of low molecular weight paraffinic materials such as propane or butane or mixtures of propane and butane to form relatively large amounts of naphthenes and aromatic materials therefrom. Suitable fractions are then separated from the product and subjected to hydrogenation conditions to form a gasoline blend stock of exceptionally high quality. Other advantages of the present invention may be seen from a reading of the following description taken with the drawing in which the figure is a flow sheet illustrating a preferred mode of practicing the present invention.

Turning now to the drawing, it will be seen that a low molecular weight paraffinic material is withdrawn from storage vessel 11 through line 12 to thermal polymerization unit 13. Not only are paraffinic materials converted into olefins in the thermal polymerization unit, but in addition large quantities of naphthenes and aromatics are formed. The product from the thermal polymerization unit is then withdrawn via line 14 and sent to a fractionating tower 15. The fractionating tower may be operated to separate the product from the thermal polymerization unit into a gaseous fraction, a low boiling fraction vaporizing at temperatures up to 100° F., a medium fraction boiling from 100 to 175° F. and a heavy fraction boiling from 175° to 400° F. The lighter gaseous fraction is withdrawn as overhead through line 16, the fraction containing $C_3$ and boiling up to 100° F. is withdrawn as a side stream through line 21, the medium fraction boiling from 100° to 175° F. is withdrawn as a side stream through line 17, and the heavier fraction removed from the lower portion of the tower via line 18.

The fraction withdrawn as a side stream 17 is rich in cyclopentane, cyclopentene, methylcyclopentane and methylcyclopentene. The cyclopentane and the methylcyclopentane are valuable as a high quality aviation gasoline blending agent. The cyclopentene and methylcyclopentene may be hydrogenated to cyclopentane and methylcyclopentane to make them valuable for use in aviation gasoline. Accordingly, the side stream withdrawn through line 17 may be passed to hydrogenation unit 19 and subjected to hydrogenation conditions and the hydrogenated product removed therefrom via line 20. The product obtained from unit 19 may be suitably blended in subsequent steps (not shown) to yield high quality aviation gasoline.

In the thermal polymerization treatment carried out in unit 13, the temperature is preferably maintained within the range of 1000° to 1100° F. and pressures within the range of 1500 to 2500 pounds per square inch. Under these conditions the contact time may be varied between 30 seconds and 5 minutes. The feed stock sent to the thermal polymerization unit may optionally be propane or butane or an admixture of propane and butane. When such a feed is sent to the thermal polymerization step maintained under the physical conditions listed above, the product will include olefins such as ethylene, propylene, butylenes and pentylenes. In addition, there will be substantial amounts of naphthenes, cycloolefins and aromatics. Compounds making up the last named groups which are present in the product from the thermal polymerization of the light paraffins are: cyclopentane, cyclopentene, methylcyclopentane, methylclopentene, cyclohexane, cyclohexene, methylcyclohexane, methylclohexene, benzene, toluene, and xylenes.

The product of the thermal polymerization step may be fractionated in distilling column 15 as described above to separate a fraction containing cyclopentene and methylcyclopentene. This is the medium boiling fraction withdrawn as a side stream through line 17 and sent to hydrogenation unit 19. Hydrogenation of this fraction containing cyclopentene and methylcyclopentene yields cyclopentane and methylcyclopentane and this product is particularly suitable for high quality aviation gasoline.

The hydrogenation step in unit 19 is preferably carried out under a pressure in the range of 10 to 50 atmospheres and a temperature in the range of 125° F. to 250° F. in the presence of a hydrogenation catalyst. It will generally be desirable to employ activated nickel or chromic oxide as the catalyst in the hydrogenation step but large numbers of other hydrogenation catalysts are well known to the art and may be employed in this step if desired.

In order to illustrate further the invention, the following example is provided. This example illustrates the type of products obtainable from a propane-butane mixture treated in accordance with the process under consideration.

The hydrocarbon mixture, consisting of 19 volume per cent propane and 81 volume per cent butane, was charged to a thermal polymerization process. This process was carried out in two stages; in the first stage, the mixture was heated from about 100° F. to a temperature of 1010° F. during a period of about five minutes and in the second stage, the temperature was further elevated to 1035° F., and the mixture retained at this temperature for a period of about 30 seconds. The heating step was carried out at a pressure of 1700 pounds per square inch. A conversion per pass to $C_4$-free polymer (400° F. end point gasoline on a $C_4$-free basis) of 12.5 volume per cent of the hydrocarbons charged was realized under these operating conditions.

The product from the thermal polymerization was distilled by superfractionation into narrow boiling fractions which were submitted to subsequent testing to determine their composition. It was found that the thermal polymer contained approximately 2 volume per cent cyclopentane, 3 volume per cent cyclopentene, 5 volume per cent methylcyclopentane, 2.5 volume per cent methylcyclopentene, 1 volume per cent cyclohexane, and 2 volume per cent cyclohexene. In order to illustrate the utility of the cycloparaffin fractions for aviation gasoline production, a portion of the thermal polymer naphtha that was rich in methylcyclopentane was blended with sufficient isopentane (15 volume per cent isopentane on the mixture), leaded with 4 cc. of tetraethyl lead and tested by the 1-C Aviation Engine method. By this method, the blend was found to have a 93.7 octane number.

Since aromatics are of relatively great importance as aviation gasoline blend stocks, analyses were made of the thermal polymer naphtha to determine the amount of aromatic constituents present. The naphtha was found to contain 1 volume per cent benzene, 2.5 volume per cent toluene, 2.1 volume per cent xylenes, and 1.5 volume per cent heavier aromatics.

Since the use of unsaturates is undesirable in the production of aviation gasoline and since there are appreciable quantities of cyclo-olefins present in the thermal polymer naphtha, it was desirable to convert the cyclo-olefins to cycloparaffins for use in blending to aviation gasoline. Accordingly, a fraction of thermal polymer naphtha boiling between the temperatures of 165° F. and 187° F. was hydrogenated in the presence of Raney nickel at a pressure of 1400 lbs. per square inch and at a temperature of 185° F. The composition of this stock before and after hydrogenation was found to be as follows:

|  | Original distillate | Hydrogenated distillate |
|---|---|---|
| Aromatics, volume per cent | 13.8 | 12.3 |
| Naphthenes, volume per cent | 16.9 | 68.2 |
| Paraffins, volume per cent | 4.8 | 17.0 |
| Unsaturates, volume per cent | 64.5 | 2.5 |

The hydrogenated material was blended with isopentane to a 7 lb. Reid vapor pressure (20 volume per cent isopentane on the blend) and leaded with 4 cc. of tetraethyl lead. This mixture was found to have an octane number of 94.9 by the 1-C Aviation Engine method. It can be seen from the above table that the unsaturation of the original fraction is due largely to cyclo-olefins. This conclusion is based on the large increase in naphthene content (by conversion of cyclo-olefins to cycloparaffins) by hydrogenation and the relatively small increase in the paraffin content (by conversion of olefins to paraffins). Thus the cyclo-olefins as well as the cycloparaffins present in thermal polymer naphtha produced from propane-butane mixtures can be readily converted into high octane aviation gasoline blend stocks.

In a commercial process, the use of Raney nickel as a catalyst is undesirable since this catalyst is easily poisoned and is not readily regenerated. Also, the pressures required for hydrogenation in the presence of Raney nickel are excessive and require the use of high pressure alloy steel equipment. Therefore, it is preferred that a catalyst be used that will permit low pressure hydrogenation of the cyclo-olefins; such a compound may be selected from the group comprised of the oxides and sulfides of chromium, vanadium, molybdenum, and tungsten. Hydrogenation in the presence of these catalysts may be carried out at pressures as low as 150 lbs. per square inch and at temperatures ranging from 150° F. to 300° F.

Having fully described and illustrated the preferred modes of the present invention, what I desire to claim is:

1. A method for treating hydrocarbons comprising the steps of forming a feed stock consisting of hydrocarbons selected from the group of $C_3$ and $C_4$ paraffins passing said feed stock to a thermal polymerization zone maintained in a temperature range of 1000 to 1100° F. and at a pressure in the range of 1500 to 2500 pounds per square inch to form substantial amounts of naphthenes, cyclo-olefins and aromatic materials, removing the product from said thermal polymerization zone, fractionating said product to separate a portion boiling within the range of 100° to 175° F. and including substantial amounts of cyclo-olefins, passing said separated portion to a hydrogenation zone maintained in a temperature range of 125 to 250° F. under a pressure from 10 to 50 atmospheres and provided with a hydrogenation catalyst, maintaining said fraction in contact with said hydrogenation catalyst for a sufficient interval to convert at least substantial amounts of said cyclo-olefins to saturated ring hydrocarbons and removing said ring hydrocarbons from said hydrogenation zone.

2. A process in accordance with claim 1 in which said paraffinic feed stock is propane.

3. A process in accordance with claim 1 in which said paraffinic feed stock is butane.

4. A process in accordance with claim 1 in which said paraffinic feed stock is a mixture of propane and butane.

5. A process for treating hydrocarbons comprising the steps of forming a feed stock consisting of hydrocarbons selected from the group of $C_3$ and $C_4$ paraffins passing the feed stock to a thermal polymerization zone maintained at a temperature range of 1000 to 1100° F. and a pressure of 1500 to 2500 pounds per square inch to form substantial amounts of cyclopentene and methylcyclopentene, removing the product from said thermal polymerization zone to a fractionating zone and separating a fraction boiling within the range of 100° to 175° F. and including said cyclopentene and methylcyclopentene, passing said separated fraction to a hydrogenation zone maintained at a temperature in the range of 125 to 250° F. and under a pressure of from 10 to 50 atmospheres and containing a hydrogenation catalyst, maintaining said cyclopentene and methylcyclopentene in said hydrogenation zone to convert substantial amounts thereof to cyclopentane and methylcyclopentane and removing the products from the hydrogenation zone.

6. A process in accordance with claim 5 in which said paraffinic feed stock is propane.

7. A process in accordance with claim 5 in which said paraffinic feed stock is butane.

8. A process in accordance with claim 5 in which said paraffinic feed stock is a mixture of propane and butane.

JOHN M. POWERS.